United States Patent [19]

Carlson

[11] 3,860,352
[45] Jan. 14, 1975

[54] RETAINER FITTING FOR CONTROL ASSEMBLIES
[75] Inventor: John A. Carlson, Wichita, Kans.
[73] Assignee: Conchemco, Incorporated, Lenexa, Kans.
[22] Filed: June 11, 1973
[21] Appl. No.: 368,737

[52] U.S. Cl. .................. 403/263, 403/317, 403/122
[51] Int. Cl. .............................................. F16b 7/00
[58] Field of Search .......... 403/263, 315, 316, 317, 403/322, 321, 122, 331; 24/230 AM, 211 R

[56] References Cited
UNITED STATES PATENTS
| | | | |
|---|---|---|---|
| 1,205,053 | 11/1916 | Steiner | 24/224 SS |
| 3,362,050 | 1/1968 | McCarthy | 24/230 AM |
| 3,438,099 | 4/1969 | Green | 24/224 HE |
| 3,516,299 | 6/1970 | Conrad | 403/122 X |

Primary Examiner—Andrew V. Kundrat
Attorney, Agent, or Firm—Schmidt, Johnson, Hovey & Williams

[57] ABSTRACT

A retainer fitting is provided for a control assembly such as may be used in connection with the throttle control of a carburetor or the like. A terminal means having an angularly disposed socket therein for the reception of a control link is integrally affixed to a shiftable core element of the assembly and is received in a pocket of an open-ended, axially shiftable retainer member carried by the core element. The retainer member has a pair of opposed slots into one of which the link snaps and is held thereby when the fitting is fully assembled along with the control assembly and control link, the remaining slot receiving, in snapping engagement, a lobe projecting from the terminal means opposite the control link.

10 Claims, 5 Drawing Figures

PATENTED JAN 14 1975 3,860,352
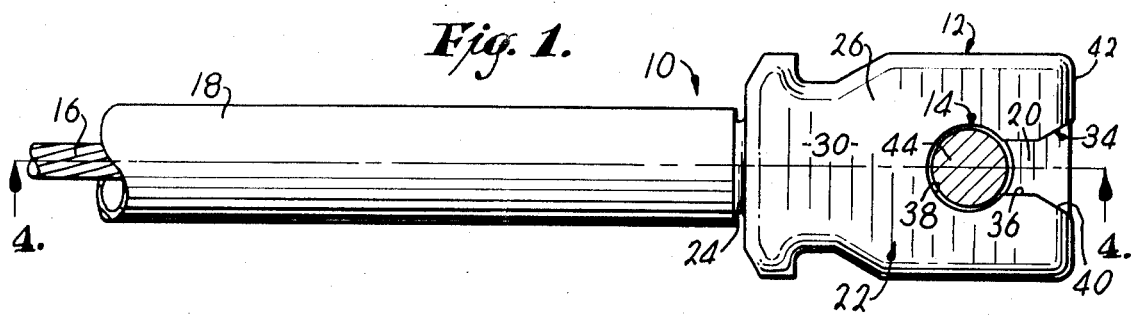
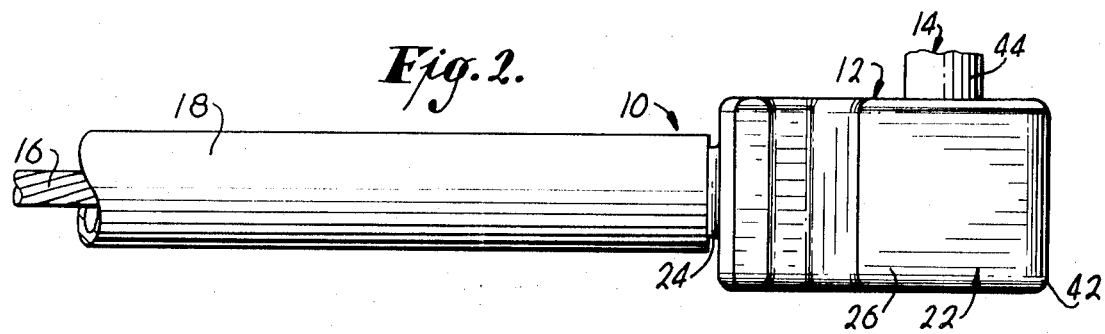
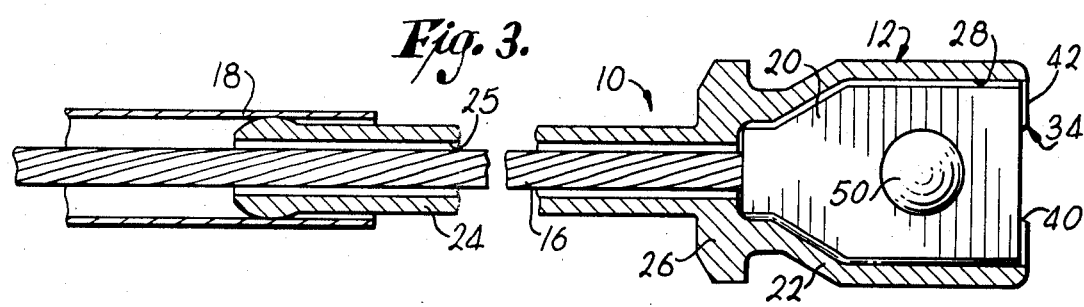
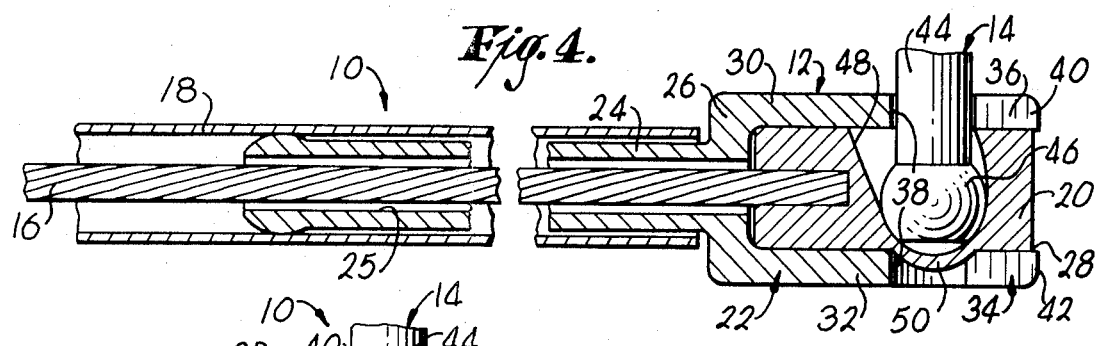
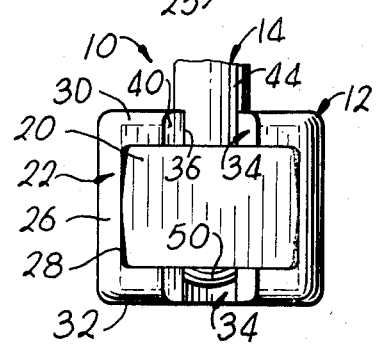

RETAINER FITTING FOR CONTROL ASSEMBLIES

This invention relates to a retainer fitting of the kind employed in connection with a remote control assembly for releasably joining the same to a control link of a mechanical device. The device may be one of any number of various controllable mechanisms, an example of which would be an sutomotive carburetor in which the throttle control link thereof would be controlled from an operator's station through the use of such a control assembly.

It is a very important object of the invention to provide a retainer fitting for a control assembly in which the fitting may be readily adapted for use with various types of control assemblies and which may be used with any number of different mechanical devices requiring the use of a remote control assembly.

Yet another important object of my invention is the provision of a retainer fitting for a control assembly in which the fitting does not restrict or bind the control link to which the assembly is retained, and which permits free rotational movement of the control link relative to the control assembly, thus aiding in the establishment of proper alignment of the link with the control assembly.

Still another important object of the invention is the provision of a reliable retainer fitting in which the control assembly, of which it is a part, is not susceptible to inadvertent release from the control link to which it is attached.

Yet another object of the invention is the provision of a reusable, low-cost retainer fitting for a control assembly and which permits the attachment of the control link to the assembly by manually snapping the retainer fitting into engagement with the link without the use of tools.

In the drawing:

FIG. 1 is a fragmentary plan view of a control assembly having a retainer fitting made pursuant to the present invention, a control link retained by the fitting being shown in section;

FIG. 2 is a fragmentary, side elevational view of the control assembly and its retainer fitting;

FIG. 3 is a bottom plan view of the control assembly and retainer fitting with portions of the control assembly and fitting shown in section;

FIG. 4 is a fragmentary, longitudinal cross-sectional view taken along line 4—4 of FIG. 1; and FIG. 5 is a fragmentary end elevational view of that end of the control assembly having the retainer fitting.

A remote control assembly, broadly designated by the numeral 10, is provided with a retainer fitting means 12 to releasably and operably join the control assembly 10 with a control link 14. The assembly 10 may be one of various types which are readily and commercially available for regulating or guiding the operation of a mechanism, such as the throttle control of an automotive carburetor or the like, from an operator's station removed from the immediate location of the mechanismm or for use in those instances where the direct regulation of the mechanism's control link is not desirable. It is to be understood that the control assembly 10, while being illustrated in the figures as being of the kind having a cablized core element 16 which is axially shiftable relative to a tubular cover 18, may be of other types of construction yet utilize retainer fitting means as herein disclosed and described.

The retaining means 12 is comprised of terminal means in the form of a generally rectilinear body 20 affixed to and made integral with the core element 16 such as by swaging, molding or the like, and an axially shiftable retainer member 22 carried by the core element 16 in surrounding relationship therewith. The retainer member 22 includes a sleeve 24 presenting a conduit 25 through which the core element 16 passes and terminates in an enlarged casing or housing 26 having an open-ended pocket 28 adapted to telescopically receive the body 20, as best seen in FIGS. 3 and 4, when the member 22 is shifted axially relative to the element 16 such that the housing 26 surrounds the body 20. The pocket 28 is of a configuration substantially the same as that of the terminal means or body 20. Opposed top and bottom walls 30 and 32, as seen when viewing FIG. 4, are each provided with snap-lock structure integrally formed therein to present an open-ended slot 34 especially configured to present a narrow, central throat section 36 and an enlarged, inner terminus 38. The two slots 34 are in alignment with each other and each present a flared entry 40 to their respective throat sections 36 at that end 42 of the housing 26 opposite the sleeve 24.

It is to be noted that the throat sections 36 of the slots 34 are of a somewhat smaller transverse dimension than that of a shank portion 44 of the control link 14, while the inner termini 38 are of a somewhat larger transverse dimension that that of the shank 44. This relationship of the shank portion 44 with respect to the slot 34 in the upper wall 30 may be best seen by referring to FIG. 1. Attention is also directed to the enlarged free end 46 of the control link 14 and attention is further directed to the fact that this spherical end is of a somewhat larger transverse dimension than is the diameter of the inner terminus 38 of the slots 34.

In referring to FIG. 4 it will be observed that the body 20 is provided with a socket 48 which is angularly disposed therewithin at an acute angle with respect to the core element 16. The socket 48 is generally cylindrical in shape and is of a somewhat larger diameter than that of the spherical end 46 of the control link 14 in order that the latter may be freely movable therewithin. That side of the body 20 opposite the socket opening 48 presents a spherical lobe or projection 50 which defines the closed end of the socket 48.

In use, at the time a control assembly 10 is to be linked or co-joined with the control link 14 of a device (not shown) to be controlled, as for example, a carburetor, the retainer member 22 is shifted axially of the core element 16 such that the terminal means 20 is outside of the pocket 28 thus leaving the socket 48 fully exposed. This relative positioning of the member 22 and the body 20 would be accomplished by shifting the member 22 to the left relative to the element 16 as viewed in FIG. 3. To effect linkage of the control assembly 10 with the control link 14, it is but then a simple matter to place the spherical end 46 in the socket 48 after which the retainer member 22 is then shifted to the right, again using FIG. 3 as a point of reference, such that the shank 44 of the link 14 passes through the throat 36 of the slot 34 in the upper wall 30 and snaps into position upon reaching the inner terminus 38 of the slot 34 and the body 20 is fully disposed within the pocket 28. It will be further observed that as the shank 44 is passing through the throat 36 of the slot 34 in the upper wall 30, that the lobe 50 is at the same time following a corresponding path of travel through the slot 34 located in the lower wall 32, resulting in the lobe 50 likewise being snapped into position at the inner terminus 38 of the lower slot 34.

It will be seen by referring to FIG. 1 that the throat section 36 prevents the control link 14 from moving out of the slot unless an abnormal force is exerted, this snap-like arrangement serving to also keep the body 20 locked in position in the pocket 28 of the retainer member 22, the oversized, inner terminus 38 as well as the oversized socket 48 allowing free rotational movement of the control link 14 while it is being held by the fitting means 12 to permit alignment of the assembly 10 with the link 14 as required. Accordingly, the enlarged, spherical ball end 46 of the link 14 prevents the same from being pulled out of the socket 48 by virtue of its having a larger transverse dimension than that of the inner terminus 38 of the upper slot 34. The lobe 50 serves primarily to hold the body 20 in the pocket 28 in much the same manner as does the shank 44 of the link 14, thus cooperating with the link 14 in holding the body 20 as well as the link 14 in their operating positions.

It will be seen from the foregoing description that there has been herein disclosed a novel retainer fitting for use with various control assemblies in which the fitting provides a positive and reliable connection with a control link while permitting relative freedom of movement thereof thus avoiding problems associated with improper assembly and binding engagement, yet is reliable and not readily susceptible to inadvertent disconnection under normal use conditions. Further, the simplified construction of the fitting not only results in a low cost unit but does not require the use of tools for assembly or disassembly with a mating control link.

It is to be understood that various modifications of certain details of construction may be made from the precise form of that shown and described for illustrative purposes herein without departing from the spirit of the invention. Accordingly, the invention should be deemed as limited only by the scope of the claims as follows.

Having thus described the invention, what is claimed as new and desired to be secured by Letters Patent is:

1. In a remote control assembly for use in conjunction with a control link, retaining means for releasably and operably joining said control assembly and said control link, said retaining means comprising:
   terminal means affixed to and integral with a shiftable core element of said control assembly;
   a shiftable retainer member carried by said element and presenting a pocket adapted to receive said terminal means therein,
   said link having a shank portion and an enlarged free end;
   a socket in said terminal means disposed to receive said free end of said link; and
   snap-lock structure integrally formed in said retainer member and adapted to releasably retain said link in engagement therewith for unitary movement with said core element when said free end is in said socket and said terminal means is disposed in said pocket,
   said snap-lock structure being an open-ended slot disposed in a wall of said member,
   said slot having a central throat section and an enlarged inner terminus,
   said section and said terminus each being of a somewhat smaller transverse dimension than that of said shank portion and said free end respectively of said link.

2. Retaining means as set forth in claim 1, wherein said member is provided with a second snap-lock structure having an open ended slot provided with a central throat section and an enlarged inner terminus, said terminal means presenting a lobe disposed to be in engagement with the inner terminus of the slot of said second snap-lock structure when said terminal means is in said pocket.

3. Retaining means as set forth in claim 2, wherein the inner terminus of the slot of each said snap-lock structure, said lobe and said free end and said shank portion of said link are in alignment with one another normally of said core element when said control assembly and said control link are co-joined.

4. Retaining means as set forth in claim 2, wherein said socket is generally cylindrically shaped and angularly disposed within said terminal means and wherein said enlarged free end of said link is spherical and of a somewhat lesser cross-section than the diameter of said socket, said link being freely rotatable relative said control assembly when retained thereby.

5. Retaining means as set forth in claim 1, wherein said retainer member is carried by said element in surrounding relationship therewith and is shiftable axially therealong, said pocket telescopically receiving said terminal means when said member is shifted there adjacent.

6. In a remote control assembly for use in conjunction with a control link, retaining means for releasably and operably joining said control assembly and said control link, said retaining means comprising:
   terminal means affixed to and integral with a shiftable core element of said control assembly;
   a shiftable retainer member carried by said element and presenting a pocket adapted to receive said terminal means therein,
   said link having a shank portion and an enlarged free end;
   a socket in said terminal means disposed to receive said free end of said link; and
   snap-lock structure integrally formed in said retainer member and adapted to releasably retain said link in engagement therewith for unitary movement with said core element with said free end is in said socket and said terminal means is disposed in said pocket,
   said socket having a central, longitudinal axis angularly disposed at an acute angle relative to said core element.

7. Retaining means as set forth in claim 6, wherein said member is provided with a second snap-lock structure disposed in a wall opposite said first-mentioned snap-lock structure, said terminal means presenting a generally rectilinear body having a spherical projection opposite said socket whereby said projection is disposed in engagement with said second snap-lock structure when said link is in engagement with said first-mentioned snap-lock structure.

8. In a remote control assembly for use in conjunction with a control link, retaining means for releasably and operably joining said control assembly and said control link, said retaining means comprising:

terminal means affixed to and integral with a shiftable core element of said control assembly;

a shiftable retainer member carried by said element and presenting a pocket adapted to receive said terminal means therein, said link having a shank portion and an enlarged free end;

a socket in said terminal means disposed to receive said free end of said link, said socket being disposed within said terminal means at an oblique angle relative to said core element; and means for holding said link in engagement with the retainer member for unitary movement with said core element when said free end is in said angular socket and said terminal means is disposed in said pocket.

9. Retaining means as set forth in claim 8 wherein said socket is disposed at an acute angle relative to said core element.

10. Retaining means as set forth in claim 9 wherein said retainer member presents a wall having an open-ended slot therein forming a part of said link holding means, said slot having a transverse dimension somewhat smaller than that of the free end of said link and having a closed terminus adjacent the shank portion of said link when the same is normally disposed in said socket and the terminal means is in said pocket, whereby the shank portion of said link is guided toward said closed terminus by the angular disposition of said socket in response to any outwardly directed movement of the link and its free end from said socket.

* * * * *